US012432618B2

(12) United States Patent
Zou et al.

(10) Patent No.: US 12,432,618 B2
(45) Date of Patent: Sep. 30, 2025

(54) DATA FORWARDING IN CENTRALIZED UNIT AND DISTRIBUTED UNIT SPLIT ARCHITECTURES

(71) Applicant: ZTE CORPORATION, Guangdong (CN)

(72) Inventors: Wei Zou, Shenzhen (CN); He Huang, Shenzhen (CN); Li Tian, Shenzhen (CN); Li Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 372 days.

(21) Appl. No.: 18/092,657

(22) Filed: Jan. 3, 2023

(65) Prior Publication Data
US 2023/0164628 A1 May 25, 2023

Related U.S. Application Data

(63) Continuation of application No. PCT/CN2020/002521, filed on Jul. 17, 2020.

(51) Int. Cl.
H04W 28/086 (2023.01)
H04W 76/11 (2018.01)
H04W 76/12 (2018.01)

(52) U.S. Cl.
CPC ........ *H04W 28/0864* (2023.05); *H04W 76/11* (2018.02); *H04W 76/12* (2018.02)

(58) Field of Classification Search
None
See application file for complete search history.

(56) References Cited

U.S. PATENT DOCUMENTS

| 10,972,932 | B2 * | 4/2021 | Fiorani | H04W 28/0252 |
| 11,510,270 | B2 * | 11/2022 | Fiorani | H04W 76/15 |
| 11,564,277 | B2 * | 1/2023 | Kim | H04W 76/19 |
| 12,250,703 | B2 * | 3/2025 | Wang | H04W 74/006 |
| 2015/0163821 | A1 | 6/2015 | Wu | |
| 2018/0368196 | A1 | 12/2018 | Gage | |
| 2019/0059074 | A1 * | 2/2019 | Ozturk | H04W 4/70 |

(Continued)

FOREIGN PATENT DOCUMENTS

| CN | 106851611 A | 6/2017 |
| CN | 108633003 A | 10/2018 |

(Continued)

OTHER PUBLICATIONS

First Office Action for CN Appl. No. 202080102827.7, dated Aug. 26, 2024 (with English translation, 21 pages).

(Continued)

*Primary Examiner* — Eunsook Choi
(74) *Attorney, Agent, or Firm* — Foley & Lardner LLP

(57) ABSTRACT

Presented are systems, methods, apparatuses, or computer-readable media for data forwarding in centralized unit (CU) and distributed unit (DU) split architectures. A DU may receive, from a CU, context information for forwarding of data from a wireless communication device that is in radio resource control (RRC) inactive state. The DU may receive, from the wireless communication device, the data from the wireless communication device that is in RRC inactive state. The DU may process the data according to the context information. The DU may send, to the CU, the processed data according to the context information.

20 Claims, 9 Drawing Sheets

(56) References Cited

U.S. PATENT DOCUMENTS

| | | | |
|---|---|---|---|
| 2019/0327680 A1 | 10/2019 | Xu et al. | |
| 2019/0327772 A1* | 10/2019 | Luo | H04L 1/08 |
| 2019/0349139 A1* | 11/2019 | Park | H04L 1/189 |
| 2020/0383164 A1* | 12/2020 | Kim | H04W 76/12 |
| 2021/0160949 A1* | 5/2021 | Kim | H04W 76/27 |
| 2021/0176802 A1* | 6/2021 | Sirotkin | H04W 88/085 |
| 2021/0378052 A1* | 12/2021 | Fujishiro | H04W 76/20 |
| 2022/0338298 A1* | 10/2022 | Xu | H04W 52/0229 |
| 2023/0071486 A1* | 3/2023 | Zhu | H04W 76/27 |

FOREIGN PATENT DOCUMENTS

| | | |
|---|---|---|
| CN | 108882235 A | 11/2018 |
| CN | 110139386 A | 8/2019 |
| CN | 110402607 A | 11/2019 |
| CN | 110786065 A | 2/2020 |
| CN | 110800336 A | 2/2020 |
| CN | 111246590 A | 6/2020 |
| CN | 111344980 A | 6/2020 |
| CN | 111373835 A | 7/2020 |
| WO | WO-2019/061179 A1 | 4/2019 |
| WO | WO-2019/194486 A1 | 10/2019 |
| WO | WO-2020/033451 A1 | 2/2020 |
| WO | WO-2020/036460 A1 | 2/2020 |
| WO | WO-2020/110825 A1 | 6/2020 |

OTHER PUBLICATIONS

Huawei et al., "Security of Inactive to Connected state transition", 3GPP TSG-RAN2 Meeting #101, R2-1803263, Mar. 2, 2018, Athens, Greece (4 pages).

Samsung et al., "UE Context Fetch Procedure in Xn", 3GPP TSG-RAN WG3#99bis, R3-181760, Apr. 20, 2018, Sanya, China (4 pages).

Extended European Search Report on EP Appl. Ser. No. 20945183.0 dated Sep. 5, 2023 (6 pages).

International Search Report and Written Opinion for PCT Appl. No. PCT/CN2020/10251 mailed Mar. 15, 2021 (10 pages).

Second Office Action for CN Appl. No. 202080102827.7, dated Jan. 22, 2025 (with English translation, 23 pages).

"Computer Network", edited by Zhao Lei; associate-edited by Peng Gaoxiang, Wang Ganlin Luo Yiyuan, Shanghai Jiao Tong University Press, Jul. 31, 2017, pp. 153-159.

* cited by examiner

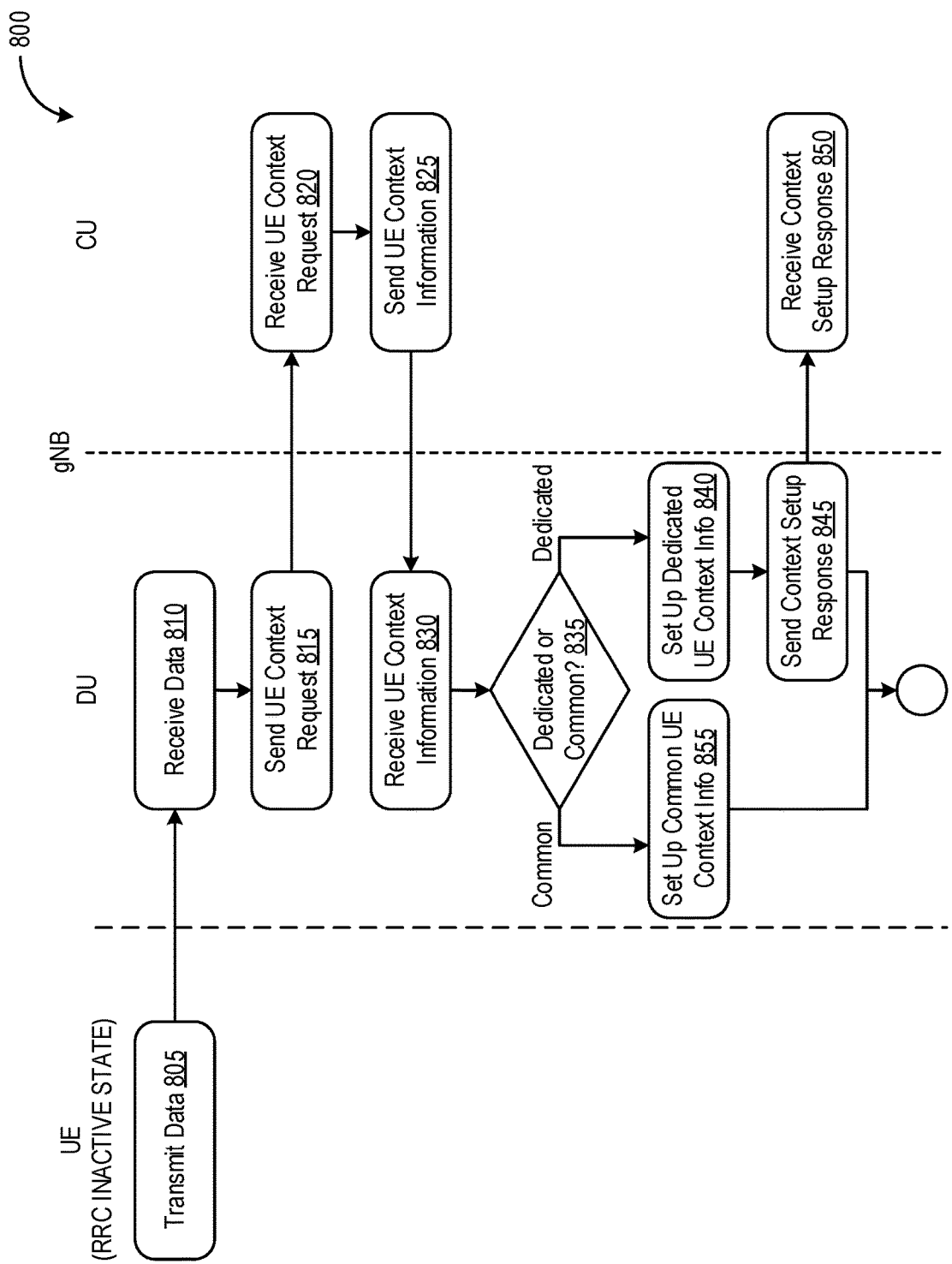

US 12,432,618 B2

DATA FORWARDING IN CENTRALIZED UNIT AND DISTRIBUTED UNIT SPLIT ARCHITECTURES

CROSS-REFERENCE TO RELATED APPLICATION

This application claims the benefit of priority under 35 U.S.C. § 120 as a continuation of PCT Patent Application No. PCT/CN2020/102521, filed on Jul. 17, 2020, the disclosure of which is incorporated herein by reference in its entirety.

TECHNICAL FIELD

The disclosure relates generally to wireless communications, including but not limited to systems and methods for data forwarding in centralized unit (CU) and distributed unit (DU) split architectures.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A distributed unit (DU) may receive, from a centralized unit (CU), context information for forwarding of data from a wireless communication device that is in radio resource control (RRC) inactive state. The DU may receive, from the wireless communication device, the data from the wireless communication device that is in RRC inactive state. The DU may process the data according to the context information. The DU may send, to the CU, the processed data according to the context information.

In some embodiments, the context information may include partial context information of the wireless communication device. The partial context information may include context of a dedicated radio bearer (DRB) having information about a transport network layer (TNL) tunnel and a radio link control (RLC) mode.

In some embodiments, the DU may send, to the CU, a user equipment (UE) context fetching request via an F1 application protocol (F1AP) interface. The UE context fetching request may include at least one of: a request for common or partial context information; an identifier allocated by the DU for the wireless communication device; an inactive radio network temporary identifier (I-RNTI) of the wireless communication device; scope of context information to be fetched; a logical channel identifier (LCID) for each dedicated radio bearer (DRB) to be setup; downlink (DL) uplink (UP) transport network layer (TNL) tunnel Information for each DRB to be setup; other context information for each DRB to be setup; other context information of the wireless communication device; or information of message type.

In some embodiments, the DU may receive, from the CU, information for partial UE context setup via the F1AP interface. The information for partial UE context setup may include at least one of: an identifier stored by the CU for the wireless communication device; an identifier allocated by the DU for the wireless communication device; the LCID for each dedicated radio bearer (DRB) to be setup; the DRB identifier for each DRB to be setup; a radio link control (RLC) mode for each DRB to be setup; uplink (UL) TNL tunnel information for each DRB to be setup; other context information for each DRB to be setup; other context information of the wireless communication device; or information of message type.

In some embodiments, the DU may send, to the CU, a partial UE context setup response via the F1AP interface. The partial UE context setup response may include at least one of: the identifier stored by the CU for the wireless communication device; the identifier allocated by the DU for the wireless communication device; the LCID for each DRB to be setup; the DRB identifier for each DRB to be setup; the DL UL TNL tunnel information for each DRB to be setup; the other context information for each DRB to be setup; the other context information of the wireless communication device; or the information of message type.

In some embodiments, the context information may include common context information for a plurality of wireless communication devices in RRC inactive state. In some embodiments, the common context may be identified by the identifier of one or more virtual wireless communication devices, in the DU and the CU.

In some embodiments, the DU may incorporate extra information to a RLC service data unit (SDU) of the data. The extra information may include at least one of: an inactive radio network temporary identifier (I-RNTI) of the wireless communication device; or a logical channel identifier (LCID) of the data in a medium access control (MAC) protocol data unit (PDU).

In some embodiments, the DU may incorporate the extra information to at least one of: a header for each radio link control (RLC) entity RLC SDU, or a radio access network (RAN) container extension header of a general package radio service (GPRS) tunneling protocol user plane (GTP-U) tunnel.

In some embodiments, the DU may determine a priority of the data. In some embodiments, the DU may select, according to the priority of the data, a DRB setup according to the received common context. In some embodiments, the DU may process the data using a corresponding radio link control (RLC) entity of the DRB. In some embodiments, the DU may forward the processed data using the associated transport network layer (TNL) tunnel for the DRB.

In some embodiments, the DU may determine the priority of the data according to at least one of: a resource used in transmission of the data from the wireless communication device to the DU; or priority information carried in the data. In some embodiments, information associating the resource and the priority may be sent to the wireless communication device via a RRC signaling message or a SIB.

In some embodiments, the DU determine that transmission of the data from the wireless communication device in RRC inactive state is complete, according to detection of at least one of: expiration of a timer since a last data received at the DU, a signal indicative of an end of data transmission from the wireless communication device, or a buffer status report (BSR) with a zero buffer size from the wireless communication device.

In some embodiments, the DU may send, to the CU, an indication of the end of the data transmission via the F1 application protocol (F1AP) interface. In some embodiments, the indication may include a cause value in a F1AP message for requesting release of the context information.

In some embodiments, the DU may receive, from the CU, a command for releasing the partial context information. In some embodiments, the DU may receive, from the CU, an indication of a reason for the release including the wireless communication device leaving the radio access network (RAN) based notification area (RNA). In some embodiments, the DU may receive, from the CU, a command for releasing the common context information.

At least one aspect is directed to a system, a method, an apparatus, or a computer-readable medium. A centralized unit (CU) may transmit, to a distributed unit (DU), context information for forwarding of data from a wireless communication device that is in radio resource control (RRC) inactive state. The CU may receive, from the DU, data transmitted by the wireless communication device and processed by the DU in accordance with the context information.

In some embodiments, the context information may include partial context information of the wireless communication device. The partial context information may include context of a dedicated radio bearer (DRB) having information about a transport network layer (TNL) tunnel and a radio link control (RLC) mode.

In some embodiments, the CU may receive, from the DU, a user equipment (UE) context fetching request via an F1 application protocol (F1AP) interface. The UE context fetching request may include at least one of: a request for common or partial context information; an identifier allocated by the DU for the wireless communication device; an inactive radio network temporary identifier (I-RNTI) of the wireless communication device; scope of context information to be fetched; a logical channel identifier (LCID) for each dedicated radio bearer (DRB) to be setup; downlink (DL) uplink (UP) transport network layer (TNL) tunnel Information for each DRB to be setup; other context information for each DRB to be setup; other context information of the wireless communication device; or information of message type.

In some embodiments, the CU may send, to the DU, information for partial UE context setup via the F1AP interface. The information for partial UE context setup may include at least one of: an identifier stored by the CU for the wireless communication device; an identifier allocated by the DU for the wireless communication device; the LCID for each dedicated radio bearer (DRB) to be setup; the DRB identifier for each DRB to be setup; a radio link control (RLC) mode for each DRB to be setup; uplink (UL) TNL tunnel information for each DRB to be setup; other context information for each DRB to be setup; other context information of the wireless communication device; or information of message type.

In some embodiments, the CU may send, to the DU, a partial UE context setup response via the F1AP interface. The partial UE context setup response may include at least one of: the identifier stored by the CU for the wireless communication device; the identifier allocated by the DU for the wireless communication device; the LCID for each DRB to be setup; the DRB identifier for each DRB to be setup; the DL UL TNL tunnel information for each DRB to be setup; the other context information for each DRB to be setup; the other context information of the wireless communication device; or the information of message type.

In some embodiments, the context information may include common context information for a plurality of wireless communication devices in RRC inactive state. In some embodiments, the common context may be identified by the identifier of one or more virtual wireless communication devices, in the DU and the CU.

In some embodiments, the CU may cause the DU to incorporate extra information to a RLC service data unit (SDU) of the data, the extra information including at least one of: an inactive radio network temporary identifier (I-RNTI) of the wireless communication device; or a logical channel identifier (LCID) of the data in a medium access control (MAC) protocol data unit (PDU).

In some embodiments, the CU may cause the DU to incorporate the extra information to at least one of: a header for each radio link control (RLC) entity RLC SDU, or a radio access network (RAN) container extension header of a general package radio service (GPRS) tunneling protocol user plane (GTP-U) tunnel.

In some embodiments, the CU may cause the DU to determine a priority of the data. In some embodiments, the CU may cause the DU to select, according to the priority of the data, a DRB setup according to the received common context. In some embodiments, the CU may cause the DU to process the data using a corresponding radio link control (RLC) entity of the DRB. In some embodiments, the CU may cause the DU to forward the processed data using the associated transport network layer (TNL) tunnel for the DRB.

In some embodiments, the CU may cause the DU to determine the priority of the data according to at least one of: a resource used in transmission of the data from the wireless communication device to the DU; or priority information carried in the data. In some embodiments, information associating the resource and the priority may be sent to the wireless communication device via a RRC signaling message or a SIB.

In some embodiments, the CU may cause DU to determine that transmission of the data from the wireless communication device in RRC inactive state is complete, according to detection of at least one of: expiration of a timer since a last data received at the DU, a signal indicative of an end of data transmission from the wireless communication device, or a buffer status report (BSR) with a zero buffer size from the wireless communication device.

In some embodiments, the CU may receive, from the DU, an indication of the end of the data transmission via the F1AP interface. In some embodiments, the indication may include a cause value in a F1AP message for requesting release of the context information.

In some embodiments, the CU may send, to the DU, a command for releasing the partial context information. In some embodiments, the CU may send, to the DU, an indication of a reason for the release including the wireless communication device leaving the radio access network (RAN) based notification area (RNA). In some embodiments, the CU may send, to the DU, a command for releasing the common context information.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 8A and 8B illustrate a functional band diagram of an example method of data forwarding in centralized unit and distributed unit architectures in accordance with an illustrative embodiment.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
|---|---|
| 3GPP | 3rd Generation Partnership Project |
| 5G | 5th Generation Mobile Networks |
| 5G-AN | 5G Access Network |
| 5G gNB | Next Generation NodeB |
| AM | Acknowledged Mode |
| BSR | Buffer Status Report |
| CG | Configured Grant |
| CN | Core Network |
| CU | Centralized Unit |
| DCI | Downlink Control Information |
| DL | Down Link or Downlink |
| DRB | Dedicated Radio Bearer |
| F1AP | F1 Application Protocol |
| F1-U | F1 User Plane |
| GPRS | General Packet Radio Service |
| GTP | GPRS Tunneling Protocol |
| GTP-U | GTP User |
| LCID | Logical Channel Identifier |
| NG | Next Generation |
| NW | Network |
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PUCCH | Physical uplink control channel |
| QoS | Quality of Service |
| RA | Random Access |
| RAN | Random Access Network |
| RNA | RAN Notification Area |
| RB | Resource Bearer |
| RE | Resource Element |
| RLC | Radio Link Control |
| RNTI | Radio Network Temporary Identifier |
| RS | Reference Signal |
| RRC | Radio Resource Control |
| SDU | Service Data Unit |
| SRB | Signaling Radio Bearer |
| TC | Transmission Configuration |
| TCI | Transmission Configuration Indicator |
| TM | Transparent Mode |
| TNL | Transport Network Layer |
| UE | User Equipment |
| UL | Up Link or Uplink |
| UM | Unacknowledged Mode |
| UP | User Plane |

1. Mobile Communication Technology and Environment

Figure 1:
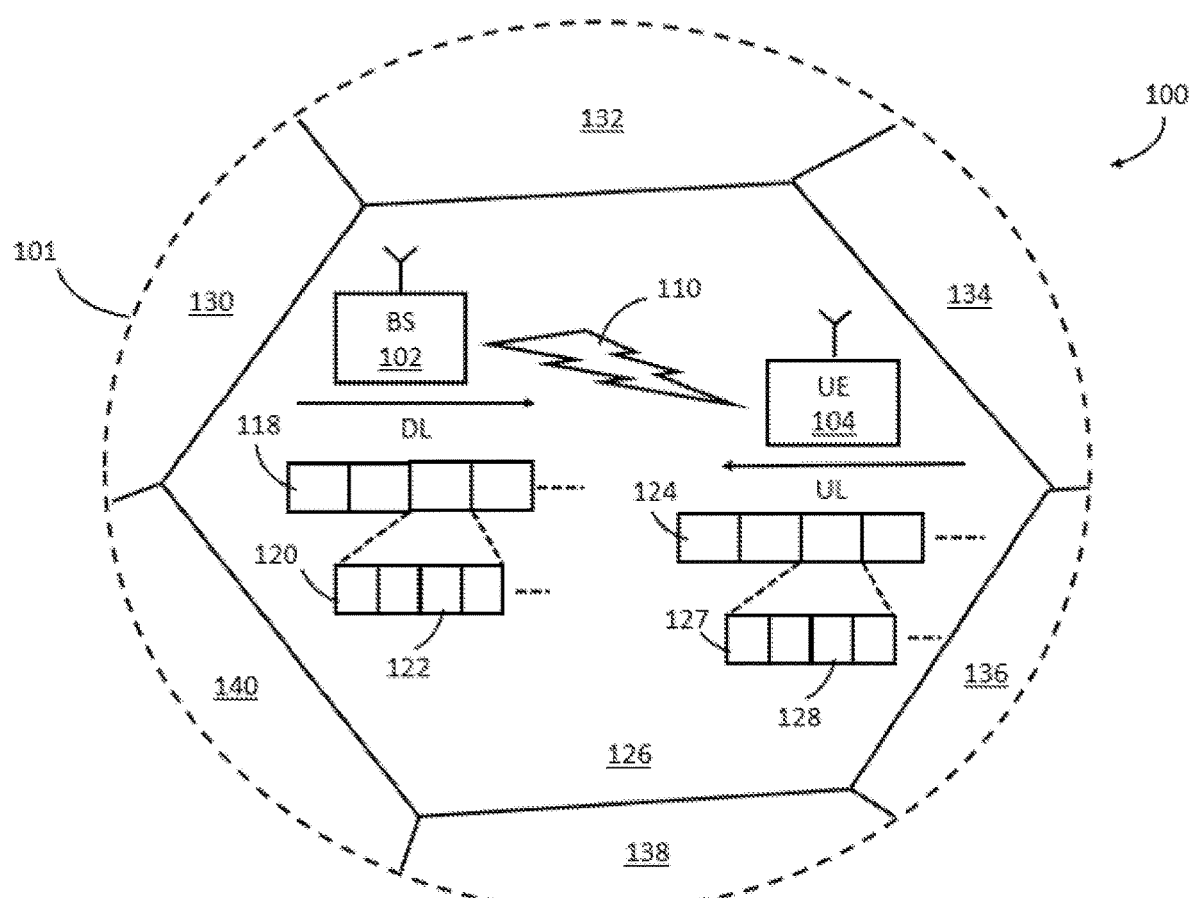
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
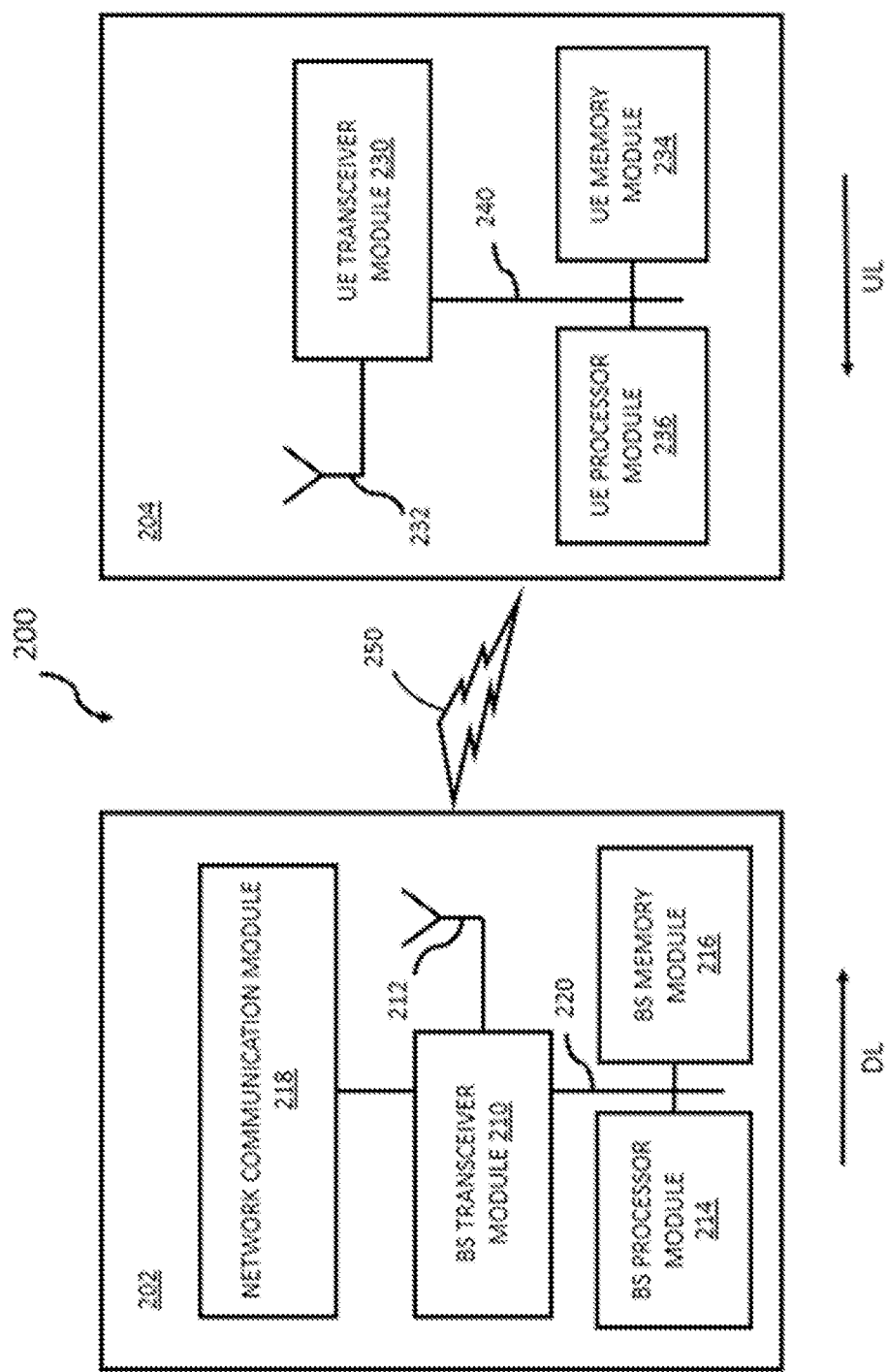
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Data Forwarding in Centralized Unit and Distributed Unit Split Architectures The present disclosure is directed to systems and methods for realizing/implementing small data (hereafter sometimes generally referred to as "data") forwarding between a distributed unit (DU) (hereafter generally referred to gNB-DU) and a centralized unit (CU) (hereafter generally referred to as gNB-CU). The forwarding of the data may be performed without radio resource control (RRC) involvement for a UE in the RRC INACTIVE state. The RRC INACTIVE state (e.g., as defined in 3GPP NR Rel-15) may provide a power efficient state with low control-plane latency. For a UE in the RRC INACTIVE state, the last serving gNB may keep its context and the associated NG connections to the core network, so that all radio bearers (RBs) may be recovered immediately after a short random access and RRC resume process on the RAN side. The gNB with the context and the associated NG connections to the core network for a UE in RRC INACTIVE state may be referred to as anchor gNB. In the CU/DU-split architecture, the gNB-CU with the context and the associated NG connections to the core network for a UE in RRC INACTIVE state is referred to as anchor gNB-CU. Conversely, the gNB-DU with the context and the associated F1 connections to the gNB-CU for a UE in RRC INACTIVE state is referred to as anchor gNB-DU.

Data transmission without state transition may not be supported for the UE in RRC INACTIVE state (e.g., under the In 3GPP NR Rel-15 specifications). That is, the UE may have to enter or transition to RRC CONNECTED state first and then initiate the data transmission. To realize this, a RRC resume process with considerable signaling consumption has to be initially performed, even when the UE only has one small data to transmit. Hence, data transmission without state transition for RRC INACTIVE UE may cause high signaling overhead and large data transmission delay.

To solve the above problems, small data transmission for an RRC INACTIVE UE may be considered. Under one approach, a RRC INACTIVE UE could send one or more small data during the random access process. In addition, a RRC INACTIVE UE may send one or more small data in a configured grant (CG). The CG may be configured before the UE is set to RRC INACTIVE state. In this method, the small data may be sent to an access point, which could be a gNB or a gNB-DU in a 5G network, through the air interface (e.g., F1 application protocol (F1AP)).

There may be a CU/DU-split scenario where a UE in the RRC INACTIVE state is moving from the anchor gNB-DU to another remote gNB-DU under the same gNB-CU. If the UE is not moving and the UE remains served by the anchor gNB-DU with its context and F1 connections, the small data may be delivered to the gNB-CU smoothly. However, when a UE in the RRC INACTIVE state is moving to another remote gNB-DU, the remote gNB-DU may not know how to handle the received small data from the air interface. This may be because the gNB-DU does not have any context for the UE.

One solution may be to reuse the RRC resume procedures where RRC messages (e.g., RRCResumeRequest, RRCResume, and RRCResumeComplete) may be exchanged between UE and gNB-DU. During the period, UE context may be set up at the gNB-DU upon request from gNB-CU via F1AP signaling. The gNB-DU may handle and process the received small data accordingly. Although the RRC resume procedures may be reused for small data forwarding at gNB-DU, the RRC messages may cause a large ratio of signaling overhead as the data from UE in the RRC INACTIVE active may be very small. To overcome this problem, a small-data forwarding method without RRC involvement may be used as detailed herein below.

A. Dedicated Context for Small Data Forwarding

In some embodiments, the gNB-DU may forward the received small data from a UE in the RRC INACTIVE state by using a set of dedicated (or partial) context (e.g., UE context), which could at least contain information on a transport network layer (TNL) tunnel, and information on a radio link control (RLC) entity if needed. In addition, a default RLC mode may be applied for the RLC-layer processing of small data, and some of the information related in the dedicated context may be omitted. The dedicated context may be fetched by the gNB-DU from a gNB-CU. After the gNB-DU receives the dedicated context, the gNB-DU may establish one or more RLC entities for the RLC layer to process small data from specific DRB. The DRB may be identified by a logical channel identifier (LCID) or eLCID in a media access control (MAC) sub-header. For each RLC entity, an associated TNL tunnel may be set up to forward the generated RLC service data unit (SDU) from the gNB-DU to the gNB-CU. The associated TNL tunnel may also include or correspond to a downlink (DL) TNL tunnel besides a uplink (UL) TNL tunnel, and the TNL tunnel itself may be a general packet radio service (GPRS) tunneling protocol (GTP) tunnel (e.g., a tunnel establish in accordance with GTP-U).

To that end, a 2-step or 3-step handshake by F1AP message may be used by the gNB-DU to fetch the dedicated context from the gNB-CU. When the gNB-DU finds/receives small data from a UE in RRC INACTIVE state, the gNB-DU may send a request for context (e.g., UE context) from gNB-CU via a F1AP connection/interface. A new F1 application protocol (F1AP) message (e.g., UE CONTEXT FETCHING REQUEST) may be configured to request the context fetching for a UE in the RRC INACTIVE state. In some embodiments, the context fetching request may be contained in an existing F1AP message in the form of a new information element.

The content of context fetching request F1AP message or the new information element may contain at least one of the following: (1) gNB-DU UE F1AP ID allocated by the gNB-DU for the UE in the RRC INACTIVE state; (2) inactive radio network temporary identifier (I-RNTI) of the UE in the RRC INACTIVE state; (3) context fetching request; (4) context fetching scope (e.g., single DRB, all DRBs, all DRBs and signaling radio bearers (SRBs), or all context for the UE); (5) a LCD for each DRB to be setup; (6) DL UP TNL tunnel information for each DRB to be setup; (7) other DRB context information; (8) other UE context information; and (9) message type, among others.

Upon reception of the F1AP message for context fetching, a context setup procedure may be triggered. Under the setup procedure, the gNB-CU may send a F1AP message (e.g., UE CONTEXT SETUP REQUEST). The gNB-DU may respond with a F1AP message (e.g., UE CONTEXT SETUP RESPONSE). After the response, the UE context may be set up at the gNB-DU, and the gNB-DU may handle the received data accordingly. In this case, the gNB-DU may become a new anchor gNB-DU, and a context release process may be triggered to release the context in the original anchor gNB-DU.

In some embodiments, the gNB-DU may request a part of the UE context. A UE CONTEXT SETUP REQUEST and UE CONTEXT SETUP RESPONSE message may be modified to contain a subset of the contents. For example, some information elements in UE CONTEXT SETUP REQUEST such as "SpCell ID" may be deleted, and the message may contain only "DRB to Be Setup List" IE. Alternatively, new messages such as PARTIAL UE CONTEXT SETUP and PARTIAL UE CONTEXT SETUP RESPONSE may be defined in F1AP to setup context at the gNB-DU for the small data. The PARTIAL UE CONTEXT SETUP REQUEST message may contain at least one of the following: (1) gNB-CU UE F1AP ID stored in gNB-CU for the UE in the RRC INACTIVE state; (2) gNB-DU UE F1AP ID for the UE in the RRC INACTIVE state; (3) DRB context contents on DRB ID; (4) a logical channel identifier (LCID) for each dedicated radio bearer (DRB) to be setup; (5) DRB context contents on RLC mode; (6) downlink (DL) uplink (UP) transport network layer (TNL) tunnel Information for each DRB to be setup; (7) other DRB context information; (8) other UE context information; or (9) message type, among others. Conversely, the PARTIAL UE CONTEXT SETUP RESPONSE message may contain at least one of the following: (1) gNB-CU UE F1AP ID for the UE in the RRC INACTIVE state; (2) gNB-DU UE F1AP ID for the UE in the RRC INACTIVE state; (3) a DRB ID for each dedicated radio bearer (DRB) to be setup; (4) a logical channel identifier (LCD) for each dedicated radio bearer (DRB) to be setup; (5) downlink (DL) uplink (UP) transport network layer (TNL) tunnel Information for each DRB to be setup; (6) other DRB context information; (7) other UE context information; or (8) message type, among others.

Furthermore, part of content in UE CONTEXT SETUP RESPONSE message may be contained in UE CONTEXT FETCHING REQUEST message so that a 2-step handshake may be enough to complete the small-data context setup process. The gNB-DU may detect the end of the small data transmission. In some embodiments, the gNB-DU may maintain a timer for the arrival of the next small data until expiration of the timer (e.g., the timer is started at the time a last data is received). That is, if no small data is received within a specified (expiration) time, the gNB-DU may consider the small-data transmission as terminated. In some embodiments, the gNB-DU may receive an end signal for transmission of small data (e.g., an ending MAC CE). In some embodiments, the gNB-DU may maintain/receive a BSR with zero buffer size in small data.

In some embodiments, when the gNB-DU finds or determines that a small-data transmission is over, the gNB-DU may release the UE context by sending a UE CONTEXT RELEASE REQUEST, where a new cause value could be defined for the end of small-data transmission. The UE CONTEXT RELEASE REQUEST can be a F1AP message, and can include one of a plurality of possible cause values, each of the cause values indicative of a different/corresponding reason for the end of the small data transmission and/or for releasing the context information. UE may determine to use above procedures according to RNA identifier (ID). That is, the gNB-DUs under the same gNB-CU may be in the same RNA. Otherwise, an RRC-involved solution may be used. Under this solution, a RRC resume procedure may be used to resume the inactive UE at first, and small data may be sent during or after the RRC resume process.

I. Partial UE Context Setup

Figure 3:
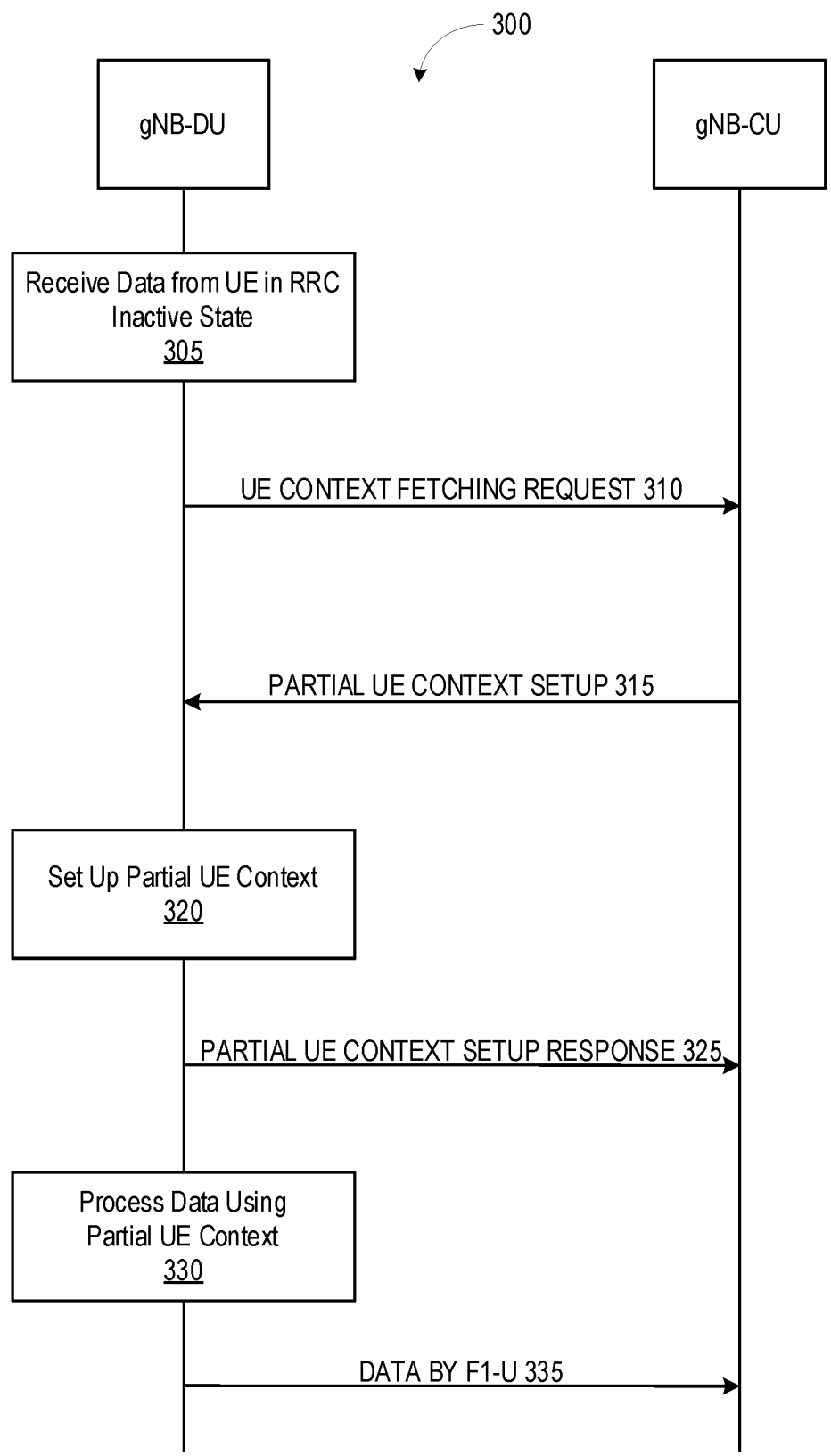
FIG. 3 illustrates a functional band diagram of an example procedure for partial context setup and data forwarding in accordance with an illustrative lustrate embodiment.

Referring now to FIG. 3, depicted is a procedure 300 for partial/dedicated (UE) context setup and data forwarding between the gNB-DU and the gNB-CU for a UE in the RRC INACTIVE state without RRC involvement. The gNB-DU may receive small data from a UE in the RRC INACTIVE state (305). After the gNB-DU receives small data from a RRC INACTIVE UE, the gNB-DU may send a new F1AP message UE CONTEXT FETCHING REQUEST to request context fetching for the UE in the RRC INACTIVE state (310). The UE CONTEXT FETCHING REQUEST message may contain at least one of the following: (1) gNB-DU UE F1AP ID allocated by the gNB-DU for the UE in the RRC INACTIVE state; (2) I-RNTI of the UE in the RRC INACTIVE STATE; (3) context fetching request; (4) context fetching scope (e.g., single DRB, all DRBs, all DRBs and SRBs, or all context for the UE); (5) a logical channel identifier (LCID) for each dedicated radio bearer (DRB) to be setup; (6) downlink (DL) uplink (UP) transport network layer (TNL) tunnel Information for each DRB to be setup; (7) other DRB context information; (8) other UE context information; or (9) message type, among others.

In response to UE CONTEXT FETCHING REQUEST, the gNB-CU may look for the UE context based on I-RNTI and LCD. The gNB-CU may send a new F1AP message PARTIAL UE CONTEXT SETUP to delivered the necessary part of UE context to the gNB-DU (315). In some embodiments, the message may be limited to including context of a single DRB including TNL tunnel and RLC mode related to the small data may be delivered to the gNB-DU. The PARTIAL UE CONTEXT SETUP REQUEST message may contain at least one of the following: (1) gNB-CU UE F1AP ID stored in the gNB-CU for the UE in the RRC INACTIVE state; (2) gNB-DU UE F1AP ID for the UE in the RRC INACTIVE state; (3) a DRB ID for each dedicated radio bearer (DRB) to be setup; (4) logical channel identifier (LCD) for each dedicated radio bearer (DRB) to be setup; (5) a RLC mode for each dedicated radio bearer (DRB) to be setup; (6) downlink (DL) uplink (UP) transport network layer (TNL) tunnel Information for each DRB to be setup; (7) other DRB context information; (8) other UE context information; or (9) message type, among others.

In response to PARTIAL UE CONTEXT SETUP, gNB-DU may setup the related partial UE context (320). The gNB-DU may send a new F1AP message, PARTIAL UE CONTEXT SETUP RESPONSE, to the gNB-DU (325). The UE context that is setup may include or involve at least one new RLC entity for the processing of small data. The PARTIAL UE CONTEXT SETUP RESPONSE message may include at least one of the following: (1) gNB-CU UE F1AP ID for the UE in the RRC INACTIVE state; (2) gNB-DU UE F1AP ID for the UE in the RRC INACTIVE state; (3) a DRB ID for each DRB (in a list of DRBs) to be setup; (4) a LCID for each DRB to be setup; (5) DL UP TNL tunnel information for each DRB to be setup; (6) other DRB context information; (7) other UE context information; or (8) message type, among others. The gNB-DU can process the (small) data using or according to the partial UE context (330). The gNB-DU may forward the small data to the gNB-CU in a F1-U packet (335). Here, the data processing may include all RLC-layers of processing by the new RLC entity.

II. Full UE Context Setup

Figure 4:
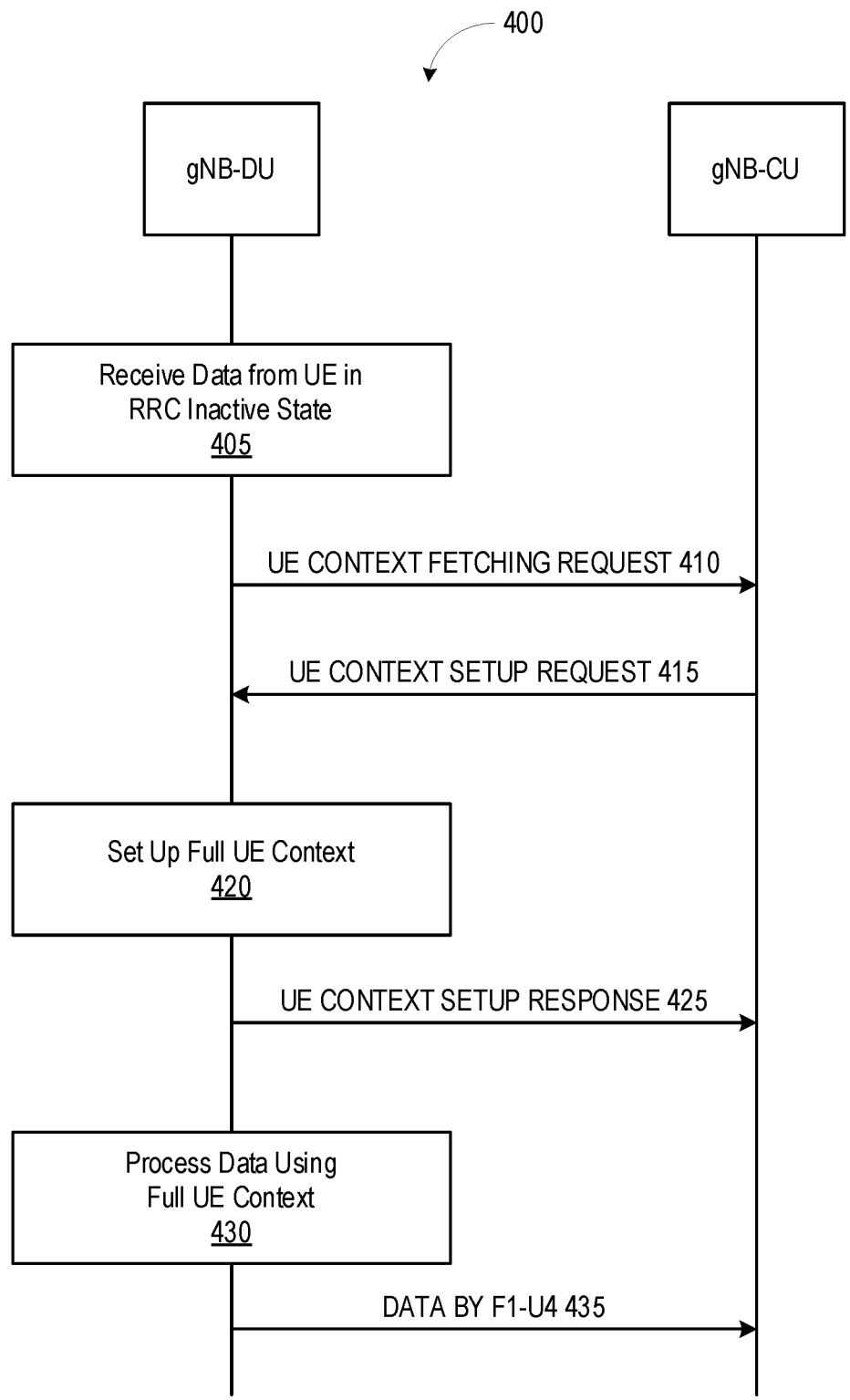
FIG. 4 illustrates a functional band diagram of an example procedure for full context setup and data forwarding in accordance with an illustrative embodiment.

Referring now to FIG. 4, depicted is a functional band diagram of a procedure 400 for full context setup and data forwarding between the gNB-DU and the gNB-CU for a UE in the RRC INACTIVE state without RRC involvement. The gNB-DU may receive data from a UE in the RRC INACTIVE state (405). The data from the UE in the RRC INACTIVE state may include or correspond to small data. After receipt of the data, the gNB-DU may send a new F1AP message (e.g., UE CONTEXT FETCHING REQUEST) to request the context fetching for the UE in the RRC INACTIVE state (310). The UE CONTEXT FETCHING REQUEST message may contain at least one of the following: (1) the gNB-DU UE F1AP ID allocated by the gNB-DU for the UE in the RRC INACTIVE state; (2) I-RNTI of the UE in the RRC INACTIVE state; (3) context fetching request; (4) context fetching scope (e.g., a single DRB, all DRBs, all DRBs and SRBs, or all context for the UE); (5) serving cell index; (6) a LCID for each DRB to be setup; (7) DL UP TNL tunnel information for each DRB to be setup; and (8) other UE context information, among others.

In response to UE CONTEXT FETCHING REQUEST, the gNB-CU may look for the UE context based on I-RNTI and LCID, and can send a F1AP message UE CONTEXT SETUP REQUEST to deliver the full UE context to the gNB-DU (415). In response to UE CONTEXT SETUP REQUEST, the gNB-DU may set up the full UE context (420). The gNB-DU may send a F1AP message (e.g., UE CONTEXT SETUP RESPONSE) to the gNB-CU (425). The gNB-DU may process the data according to the full UE context (430). The gNB-DU may forward the data to the gNB-CU in a F1-U packet (435). The data processing may include all RLC-layers of processing by the new RLC entity.

III. Context Release Procedure

Figure 5:
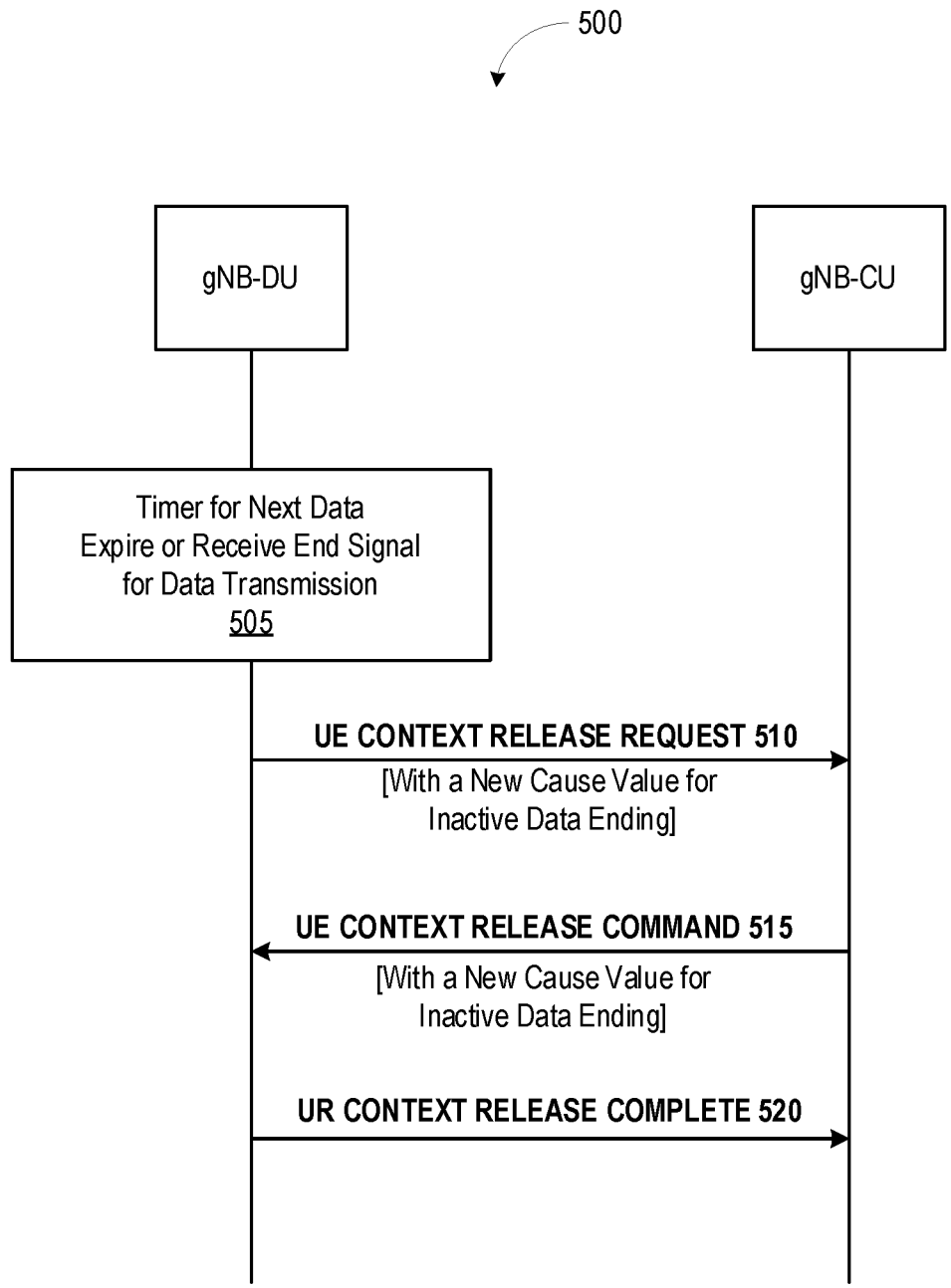
FIG. 5 illustrates a functional band diagram of an example procedure for context release after data forwarding in accordance with an illustrative embodiment.

Referring now to FIG. 5, depicted is a functional band diagram of a procedure 500 for context release after data forwarding. The gNB-DU may receive or detect data from a UE in the RRC INACTIVE state (505). After receipt of the data, the gNB-DU may perform a number of operations. In some embodiments, the gNB-DU may set up a timer for arrival of a next data until expiration of the timer. In some embodiments, the gNB-DU may wait for an end signal for small data transmission (e.g., an ending MAC CE). In some embodiments, the gNB-DU may establish or receive a BSR with zero buffer size in small data. The gNB-DU may send a F1AP message (e.g., UE CONTEXT RELEASE REQUEST) to the gNB-CU with a new cause value for completion/termination of small-data transmission (510). In some embodiments, a UE Context Release procedure may be initiated upon the gNB-CU receiving a UE CONTEXT RELEASE REQUEST message (515). The procedure may include 2-step handshake. Under the procedure, the gNB-CU initiates the procedure by sending the UE CONTEXT RELEASE COMMAND message to the gNB-DU at first. Then, the gNB-DU can release all related signaling and user data transport resources, and can reply with the UE CONTEXT RELEASE COMPLETE message (520). UE CONTEXT RELEASE COMMAND message may also contain a new cause value for inactive data ending. In some embodiments, the gNB-CU may also reply with a new F1AP confirmation message for the UE CONTEXT RELEASE REQUEST. The gNB-DU in turn may release the related UE context after the reception of the confirmation message.

IV. Information Elements for Context Fetching Request and Setup

In some embodiments, the UE CONTEXT FETCHING REQUEST message may be sent by the gNB-DU to indicate a fetching request for the UE context. The UE CONTEXT FETCHING REQUEST message could contain at least one of the following: (1) gNB-DU UE F1AP ID allocated by gNB-DU for the UE in the RRC INACTIVE state; (2) I-RNTI of the UE in the RRC INACTIVE state; (3) context fetching request; (4) context fetching scope (e.g., single DRB, all DRBs, all DRBs and SRBs, or all context for the UE); (5) a LCID for each DRB to be setup; (6) DL UP TNL tunnel information for each DRB to be setup list; (6) other DRB context information; (7) other UE context information; or (8) message type, among others. Table 1 shows an example representation of information about (or content of) a UE CONTEXT FETCHING REQUEST (message):

TABLE 1

| IE/Group Name | Presence | Range |
|---|---|---|
| Message Type | M | |
| gNB-DU UE F1AP ID | M | |
| I-RNTI | M | |

TABLE 1-continued

| IE/Group Name | Presence | Range |
| --- | --- | --- |
| Fetching scope | O | |
| ServCellIndex | O | |
| DRB Setup List | | 0 . . . 1 |
| >DRB Setup Item List | | 1 . . . <maxnoofDRBs> |
| >>LCID | M | |
| >>DL UP TNL tunnel Information to be setup List | | 1 |
| >>> DL UP TNL tunnel Information to Be Setup Item IEs | | 1 . . . <maxnoofDLUPTNL tunnelInformation> |
| >>>>DL UP TNL tunnel Information | M | |

In some embodiments, the PARTIAL UE CONTEXT SETUP REQUEST message may contain at least one of the following: (1) gNB-CU UE F1AP ID stored in the gNB-CU for the UE in the RRC INACTIVE state; (2) gNB-DU UE F1AP ID for the UE in the RRC INACTIVE state; (3) a DRB ID for each DRB (in a list of DRBs) to be setup; (4) a LCID for each DRB to be setup; (5) a RLC mode for each DRB to be setup; (6) DRB context contents on UL UP TNL tunnel information to be setup list; (7) other DRB context information; (8) other UE context information; or (9) message type, among others. Table 2 shows an example representation of information about (or content of) a partial UE CONTEXT SETUP (message):

TABLE 2

| IE/Group Name | Presence | Range |
| --- | --- | --- |
| Message Type | M | |
| gNB-CU UE F1AP ID | M | |
| gNB-DU UE F1AP ID | M | |
| DRB to Be Setup List | | 0 . . . 1 |
| >DRB to Be Setup Item IEs | | 1 . . . <maxnoofDRBs> |
| >>DRB ID | M | |
| >>LCID | M | |
| >>UL UP TNL tunnel Information to be setup List | | 1 |
| >>> UL UP TNL tunnel Information to Be Setup Item IEs | | 1 . . . <maxnoofULUPTNL tunnelInformation> |
| >>>>UL UP TNL tunnel Information | M | |
| >> RLC Mode | M | |
| >>DL PDCP SN length | O | |
| >>UL PDCP SN length | O | |
| Inactivity Monitoring Request | O | |

B. Common Context for Small Data Forwarding

In some embodiments, the gNB-DU may forward the received small data from the UE in the RRC INACTIVE state by using a set of common context. The common context may include at least certain information on a group of common TNL tunnels, and information on the RLC entity associated with each of them. In some embodiments, a default RLC mode (in the transparent mode (TM), unacknowledged mode (UM), or acknowledged mode (AM) mode) may be applied for the RLC-layer processing of small data. Some of the related information may be omitted in the common context. The common context may be fetched from the gNB-CU for small data forwarded from UEs in the RRC INACTIVE state. Based on the common context, the gNB-DU may establish one or more RLC entities for the RLC layer processing of the small data from one or more UEs in the RRC INACTIVE states. For each RLC entity, an associated TNL tunnel may be set up to forward the generated RLC SDU from the gNB-DU to the gNB-CU. The associated TNL tunnel may also contain a DL TNL tunnel besides a UL TNL tunnel.

To differentiate different small data at the gNB-CU, extra information such as header information (or an extra header) may be added at the gNB-DU for each RLC SDU, which may contain at least one of the following: (1) I-RNTI of the UE in the RRC INACTIVE state that is to send the small data and (2) LCD of the small data in MAC PDU, among others. According to the content in the header information, the gNB-CU may send each RLC SDU to the destination packet data convergence protocol (PDCP) entity for further processing. In some embodiments, the extra header information or the contents of an extra header may be delivered from the gNB-DU to the gNB-CU in the random access network (RAN) container extension header of a TNL tunnel.

In some embodiments, among the group of common TNL tunnels and the associated RLC entities, the gNB-DU may select one of the TNL tunnels and RLC entities according to the priority of small data from one or more UEs in the RRC INACTIVE state. Here, the priority of small data may be one of the following: (1) the priority indicated in the MAC PDU of the small data by the MAC CE or MAC subheader; and (2) the configured priority associated with the UL resource used for the small data transmission.

The network may configure a group of UL resources (e.g., contention-based random access (RA) resources, contention-free RA resources, or CG resources) for small data transmission with different priorities. UEs in RRC INACTIVE state may select one or more UL resources to transmit the small data based on their priority. The priority may be the priority of logical channel (LCH) used for the transmission of small data. In this case, the gNB-DU may obtain the priority information of the small data based on the resource used in UL transmissions, and select a common TNL tunnel and the associated RLC entity for RLC-layer processing and data forwarding to the gNB-CU.

Figure 6:
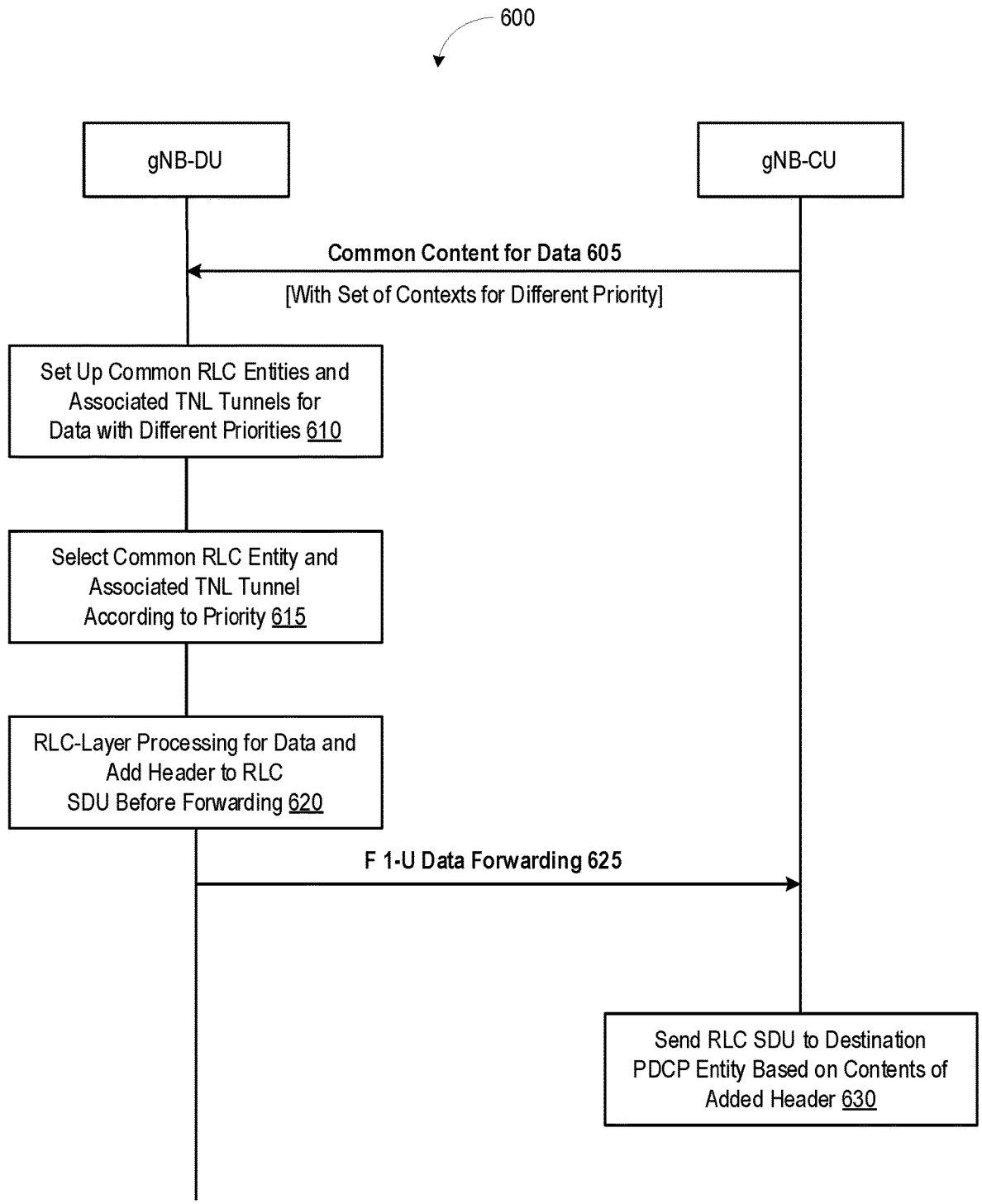
FIG. 6 illustrates a functional band diagram of an example procedure for data forwarding using common contexts in accordance with an illustrative embodiment.

Referring now to FIG. 6, depicted is a procedure 600 for data forwarding using common contexts for multiple UEs in the RRC INACTIVE state. The gNB-CU may send the common contexts to the gNB-DU for small data forwarding for UEs in the RRC INACTIVE state (605). The common contexts may at least contain information on a group of common TNL tunnels and information on the RLC entity associated with each of the TNL tunnels. In some embodiments, a default RLC mode (e.g., TM, UM, or AM) may be applied for the RLC-layer processing of the data. Some of the related information in the common context may be omitted.

Based on the received common context, the gNB-DU may set up the common RLC entities and the associated TNL tunnels for data with different priorities (610). When the gNB-DU receives a small data, the gNB-DU may select a common RLC entity and the associated TNL tunnel for RLC layer processing and data forwarding, according to the priority of data (615). The detailed priority information may be contained in the MAC PDU of the small data or determined by the UL resource used for its transmission as discussed above in conjunction with FIG. 7.

After RLC-layer processing by the common RLC entity, an extra header (or information, e.g., header information) may be added to the RLC SDU (625), which contains at least one of the following: (1) I-RNTI of the UE in the RRC INACTIVE state that sent the data; (2) the LCD of the data in MAC PDU. The gNB-DU may forward the RLC SDU with the extra header/information to the gNB-CU (625). To forward the RLC SDU, the gNB-DU may use the common TNL tunnel associated to the selected RLC entity in the form of F1-U interface. In some embodiments, the extra header/information may be contained in the RAN container extension header of GTP-U Tunnel. In some embodiments, a new frame format may be defined to deliver the contents of the extra header in the RAN container extension header of GTP-U Tunnel. After receiving the RLC SDU with the extra header/information, the gNB-CU may read the contents of the extra header/information (630). The gNB-CU may send the RLC SDU to the destination PDCP entity for further processing based on the contents in the extra header/information.

C. Consideration of Data Priority

Figure 7:
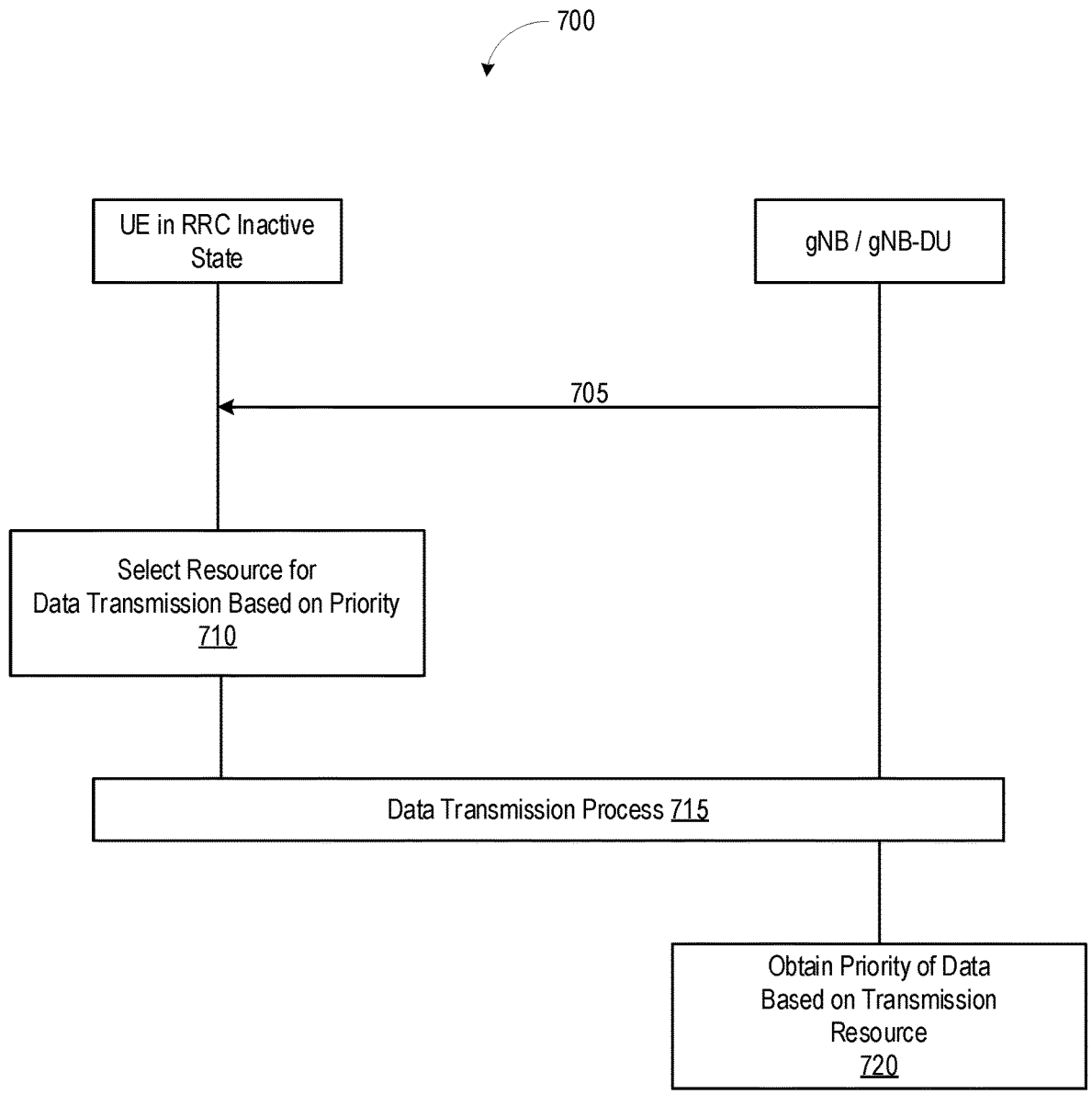
FIG. 7 illustrates a functional band diagram of an example procedure for data transmission with the consideration of data priority in accordance with an illustrative embodiment.

Referring now to FIG. 7, depicted is a functional band diagram of a procedure 700 for data transmission with the consideration of data priority. Under the procedure 700, the gNB or gNB-DU may configure common or dedicated resource for data transmission for UEs in the RRC INACTIVE state (705). Here, the dedicated resource for data transmission may be configured using RRC signaling. The common resource for data transmissions may be broadcast in a system information block (SIB). The configured resource may be, for example, an configured grant (CG), contention-based random access (RA) resource, or contention-free RA resource, among others. In some embodiments, the configured resource may be associated with one or more data priority. The priority may be the LCH priority used in the data transmission. When the UE in the RRC INACTIVE state has data to transmit, the UE may select a resource according to priority for the data to be transmitted (710). The UE may send the data by using the selected resource (715). The data may be sent in a CG resource, or during a contention-based or contention-free RA process. The gNB or the gNB-DU may receive the data and can obtain priority information based on the resource used in transmission (720).

Figure 8B:
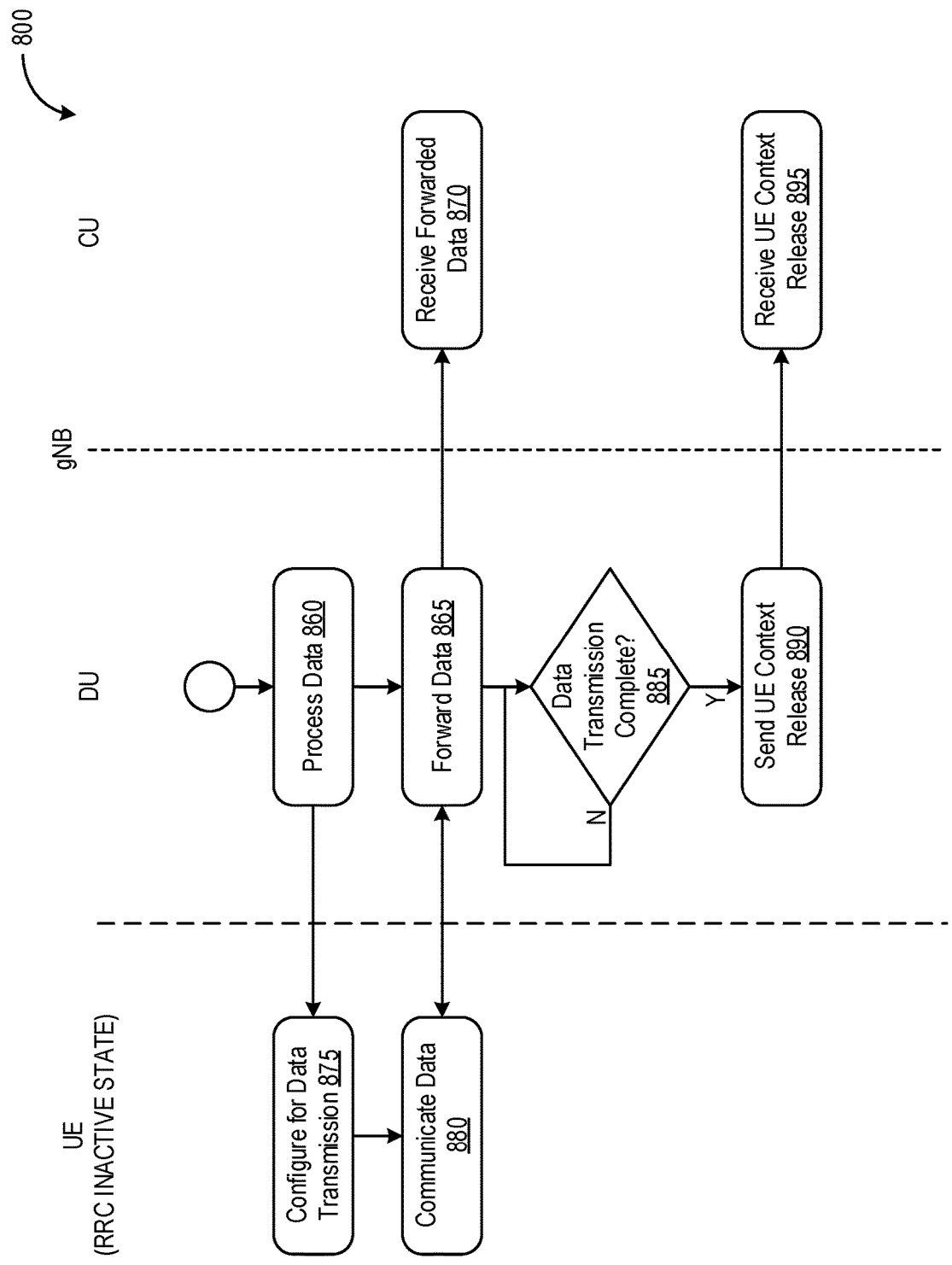

D. Process for Data Forwarding in Centralized Unit and Distributed Unit Split Architectures Referring now to FIG. 8, depicted is a flow diagram of a method 800 of data forwarding in centralized unit and distributed unit split architectures. The method 800 may be performed or implemented using any components described herein, for example, in conjunction with FIGS. 1-7. In brief overview, a user equipment (UE) may transmit data (805). A distributed unit (DU) of a gNB may receive the data (810). The DU may send a UE context fetching request (815). A centralized unit (CU) of the gNB may receive the UE context fetching request (820). The CU may send UE context information (825). The DU may receive the UE context information (830). The DU may determine whether the UE context information is dedicated (partial), full or common (835). If the UE context information is identified as dedicated, the DU may set up dedicated UE context information (840). The DU may send context setup response (845). The CU may receive the context setup response (850). If the UE context information is identified common, the DU may set up common UE context information (855). The DU may process the data (860). The DU may forward the data (865). The CU may receive the forwarded data (870). The UE may configure for data transmissions (875). The UE may communicate the data with the DU (880). The DU may determine whether the data transmission is complete (885). If the data transmission is complete, the DU may send a UE context release (890). The CU may receive the UE context release (895).

In further detail, a user equipment (UE) (e.g., UE 104) may send, provide, or transmit data to a distributed unit (DU) of a gNB (e.g., BS 102) (805). The DU of a gNB may retrieve, identify, or receive the data from the UE (810). The UE (sometimes herein referred to as a wireless communication device) may be in a radio resource control (RRC) inactive state. The gNB to which the data is sent by the UE may be configured in accordance with CU-DU split architecture. The UE may have established a communications session with the gNB in accordance with RRC protocol. When in the RRC inactive state, the UE may at least temporarily suspend the communications session with the gNB. The data transmitted by the UE may correspond to small data (e.g., small packets or payload, such as those below a defined data size), and the size of the data may be less than a 100 bytes as an example. In some embodiments, the UE may send the data (e.g., in the user plane) to the DU of the gNB over the communication session established according to the RRC protocol. In turn, the DU may receive the data from the UE over the communication session established in accordance with the RRC protocol (e.g., in the control plane).

The DU may provide, convey, or otherwise send a UE context fetching request to a centralized unit (CU) of the gNB (815). In some embodiments, the DU may send the UE context fetching request to the CU via an air interface (e.g., an F1 application protocol (F1AP) interface). In some embodiments, the DU may generate and send the UE context fetching request in response to receipt of the data from the UE. In some embodiments, the DU may generate and send the UE context fetching request independent of the receipt of data from the UE that is in the RRC inactive state. The CU may in turn retrieve, identify, or otherwise receive the UE context fetching request from the CU (820). In some embodiments, the CU may receive the UE context fetching request from the DU via the air interface. The receipt of the UE context fetching request by the CU may be in response to or independent of the receipt of the data from the UE that is in the RRC inactive state.

The UE context fetching request may correspond to, identify, or include a request for dedicated context information (or partial context information), a request for full context information, or a request for common context information. In some embodiments, the UE context fetching request may identify or include an identifier. The identifier may be generated, assigned, or otherwise allocated by the DU (or gNB) for the UE. In some embodiments, the UE context fetching request may identify or include an inactive radio network temporary identifier (I-RNTI) of the UE. The I-RNTI may be used to address or reference the UE for communications in accordance with RRC. In some embodiments, the UE context fetching request may identify or include a scope of context information to be fetch. The scope of context information may define or identify parameters or other information to be provided for the UE context.

In some embodiments, the UE context fetching request may identify or include one or more logical channel identifiers (LCIDs). The LCIDs may identify or reference (or be associated with) corresponding dedicated radio bearers (DRBs) to be set up or established. In some embodiments, the UE context fetching request may identify or include downlink (DL) uplink (UP) transport network layer (TNL) tunnel information. The DL/UP TNL tunnel information may identify or correspond to each DRB to be set up. In some embodiments, the UE context fetching request may identify or include other context information, such as a serving public land mobile network (PLMN), gNB-DU UE aggregate maximum bit rate in UL, and RRC deliver status request, among others. The other context information may identify or include parameters for each DRB to be set up. The other context information may also identify or include information of the UE. In some embodiments, the UE context fetching request may also include information of the message type.

The CU may provide, transmit, or otherwise send UE context information to the DU (825). In some embodiments, the CU may generate and send the UE context information to the DU in response to the receipt of the UE context fetching request from the DU. The context information may be for forwarding of the data from the UE that is in the RRC inactive state. Upon receipt, the CU may parse the UE context fetching request from the DU to identify the contents of the fetching request. The CU may identify, generate, or include information for UE context set up at the DU in accordance to the parsing of the UE context fetching request. For example, the CU may use at least some of the information in the UE context fetching request to generate the information for the UE context setup.

When the UE context fetching request is for a request for partial context information, the CU may identify, generate, or otherwise include information for partial UE context setup. The information for the partial UE context set up may correspond to or include information for at least the transmission of data from the identified UE using RRC signaling (e.g., one particular DRB including TNL tunnel and RLC mode). In some embodiments, the partial context information may include context of a DRB. The context of the DRB may identify or have information about TNL tunnel and RLC mode (e.g., AM, TM, or UM). In some embodiments, the information for partial UE context setup may identify or include an identifier stored by the CU for the UE. The identifier may uniquely reference or identify the UE. The information may identify or include an identifier assigned or allocated by the DU for the UE (e.g., as extracted from the request). The information may also identify or include the LCID for each DRB to be set up at the DU. The information may identify or include the RLC mode (e.g., UM, AM, or TM) under which each DRB is to be set up. The information may identify or include UL TNL tunnel information for each DRB to be set up. The information may identify or include other context information of the UE from which the data is to be sent. The information may identify or include the information of the message type.

When the UE context fetching request is for full context information, the CU may identify, generate, or otherwise include information for full UE context setup. The information for full UE context setup may be similar to or more than the information for partial UE context setup. The information may correspond to or include information for the transmission of data from the identified UE using RRC signaling (e.g., multiple DRBs including TNL tunnel and RLC mode for each DRB). In some embodiments, the information for full UE context setup may identify or include an identifier stored by the CU for the UE. The identifier may uniquely reference or identify the UE. The information may identify or include an identifier assigned or allocated by the DU for the UE (e.g., as extracted from the request). The information may also identify or include the LCID for each DRB to be set up at the DU. The information may identify or include the RLC mode (e.g., UM, AM, or TM) under which each DRB is to be set up. The information may identify or include UL TNL tunnel information for each DRB to be set up. The information may identify or include other context information of the UE from which the data is to be sent. The information may identify or include the information of the message type.

When the UE context fetching request is for common context information, the CU may identify, generate, or otherwise include information for common context UE setup. The information for common UE context setup may include information for transmission of data from any UE (from a plurality of UEs) via a common resource via the DU (e.g., broadcast via SIB). The information for common UE context may correspond to or include information for multiple UEs (also referred herein as wireless communication devices) each in RRC inactive state. In some embodiments, the information for common UE context may be identified by an identifier of one or more virtual wireless communication devices (e.g., virtual UEs) in the DU or the CU. The identifiers for the virtual wireless communication devices can differ across the DU and CU, and the DU and CU can identify or maintain the association between the identifiers. In some embodiments, the information can include configuration information for broadcasting via SIB.

The DU may retrieve, identify, or otherwise receive the UE context information from the CU (830). The UE context information may be for the forwarding of the data from the UE that is in the RRC inactive state. In some embodiments, the CU may send the context information to the DU via the air interface (e.g., F1AP protocol interface) upon generation of the information. In some embodiments, the DU may receive the context information from the CU via the air interface. The DU may identify or determine whether the UE context information is dedicated or common (835). Upon receipt, the DU may parse the UE context setup information to identify whether information is for dedicated UE context (e.g., partial context information), for full UE context or for common UE context.

If the information is identified as for dedicated UE context, the DU may use, establish, or otherwise set up dedicated UE context information (or full UE context information) (840). When the information is for dedicated/partial UE context setup, the DU may establish in accordance with the partial UE context setup information. When the information is for full UE context setup, the DU may establish in accordance with the full UE context setup information. In some embodiments, to set up, the DU may establish one or more DRBs identified in the UE context information (e.g., full or partial). The DU may generate an identifier for each DRB set up at the DU for forwarding the data from the UE to the CU. The DU may also set the RLC mode for each DRB as specified in the context information. In addition, the DU may create or instantiate the UL UP TNL tunnels using the TNL information as defined in the context information.

The DU may provide, transmit, or otherwise send context setup response to the CU (845). Based on the setting up of the UE context, the DU may generate the context information response to send to the CU. The context setup response may be for the partial UE context setup or the full UE context setup. The context setup response may include at least some of the information from the UE context information sent by the CU. In some embodiments, the context setup response may identify or include the identifier stored by the CU for the UE. The context setup response may identify or include the identifier assigned allocated by the DU for the UE. The context setup response may identify or include the LCID for each DRB set up on the DU. The context setup response may identify or include the DRB identifier for each DRB set up on the DU. The context setup response may identify or include the DL UL TNL tunnel information for each DRB set up at the DBU. The context setup response may identify or include the other context information for each DRB set up at the DU. The context setup response may identify or include the other context information for the UE. The context setup response may identify or include the information of the message type. The CU may retrieve, identify, or otherwise receive the context setup response from the DU (850). In some embodiments, the DU may send the context information response via the air interface (e.g., F1AP interface) once generated. The CU in turn may receive the context information response via the air interface from the DU.

If the information is identified as for common UE context, the DU may use, establish, or otherwise set up common UE context information (855). The DU may establish the UE context in accordance with the common context setup information received from the CU. To establish, the DU may set up one or more common RLC entities and associated TNL tunnels using the information for the data. In some embodiments, in setting up, the DU may add, include, or otherwise incorporate extra (e.g., header) information to the RLC service data unit (SDU) of the data. The SDU may correspond to a unit of data to be passed from a higher layer to a lower layer, not yet encapsulated by the lower layer. In some embodiments, the extra information may identify or include the I-RNTI of the UE. The extra information may also identify or include LCID of the data in MAC protocol data unit (PDU). In some embodiments, the DU may add, include, or otherwise incorporate the extra information to a header of each RLC entity SDU. In some embodiments, the DU may add, include, or otherwise incorporate the extra information to a RAN container extension header of a general packet radio service (GPRS) tunneling protocol user plane (GTP-U) tunnel. The GPRS GTP-U tunnel may be used to carry the data from the UE.

The DU may handle, manage, process the data in accordance with the context information (860). The processing of the data may depend on the type of context information under which the UE context was set up at the DU. When the context information in accordance with dedicated context (e.g., partial or full), the DU may process the data received from the UE using the context of the DRB and information on TNL tunnel and RLC mode specified by the context information. Once the DRB is identified, the DU may forward the data via the associated TNL tunnel to the CU.

On the other hand, when the context information is in accordance with common context, the DU may identify or determine a priority of the data to be forwarded to the CU. The priority may define or identify a precedence or sequence in which sets are data are to be forwarded. The data may be from different UEs in the RRC inactive state, and all the UEs can use the same common context for processing. In some embodiments, the DU may determine the priority of the data in accordance with a resource used in transmission of the data from the UE to the DU. In some embodiments, the DU may determine the priority of the data in accordance with priority information in the data. In some embodiments, the information may identify or associate the resource and the priority, and may be sent to the UE via RRC signaling or SIB. Based on the determined priority, the DU may identify or select a DRB setup according to the common context information. DRB may be set up using the common context information received from the CU to process and forward data from multiple UEs. With the selection, the DU may process the data using the corresponding RLC entity of the DRB. The DU may forward the processed data using the associated TNL tunnel for the DRB.

The DU may send, provide, or otherwise forward the processed data to the CU (865). Upon processing the data, the DU may forward the data to the CU (e.g., via the associated tunnel). The CU may retrieve, identify, or otherwise receive forwarded data processed by the DU (870). The CU may receive the data processed by the DU in accordance with the dedicated/partial context information or the full context information. In some embodiments, when the context information is common, the CU may retrieve, identify, or otherwise obtain priority data the data based on the transmission resource. In accordance with the transmission priority, the CU may process the data forwarded by the DU.

The UE may configure for data transmissions (875). In some embodiments, the UE may receive configuration information from the DU via the air interface (e.g., F1AP interface). The configuration information may be generated in accordance with the context information used to set up the UE context at the DU. The configuration information may include, for example, priority information for data transmission. The UE may transmit, exchange, or otherwise communicate data with the DU (880). In accordance with the configuration information, the UE may transmit the data with the DU. In some embodiments, the UE may select the resource for data transmission based on the configuration information (e.g., the priority information for data transmissions to the DU).

The DU may identify or determine whether data transmission is complete (885). In some embodiments, the DU may determine whether the data transmission is complete based on detection of an expiration of a timer since a last data received at the DU. The timer may be maintained by the DU, and may be used to track an amount of time elapsed since arrival of previous data. The timer may also have a threshold time for expiration. When the timer exceeds the threshold time, the DU may determine that the data transmission is complete. Otherwise, when the timer is less than the threshold time, the DU may continue to wait. In some embodiments, the DU may determine whether the data transmission is complete based on a signal indicative of an end of data transmission from the UE. The signal may be identified from or included in the data transmitted from the UE. When the signal with the indication is received, the DU may determine that the data transmission is complete. Otherwise, the DU may continue to wait. In some embodiments, the DU may determine whether the data transmission is complete based on a buffer status report (BSR) with a zero buffer size from the UE. When the BSR with zero buffer size is received or identified, the DU may determine that the data transmission is complete. Otherwise, the DU may continue to wait.

If the data transmission is determined to be complete, the DU may transmit, provide, or otherwise send a UE context release (890). In response to the determination that the data transmission is complete, the DU may generate or initiate the UE context release. In some embodiments, the DU may generate an indication of the end of transmission in response to the determination Once generated, the DU may provide, transmit, or send the indication via the air interface. In some embodiments, the indication may be identified or included by a cause value in a message (e.g., a F1AP message) for requesting release of the context information. The cause value may correspond to the end of transmission. For instance, the F1AP message can include one of a plurality of possible cause values, each of the cause values indicative of a different or corresponding reason for an expected action, e.g. requesting release of the context information.

The CU may retrieve, identify, or otherwise receive the UE context release from the DU (895). In some embodiments, the CU and DU may communicate with each other UE context release. In some embodiments, the CU may receive the indication of the end of transmission from the DU via the air interface. In some embodiments, the CU may send a command for releasing dedicated context information (e.g., partial context information) to the DU. In some embodiments, the command may indicate a reason for the release. The reason for the release may include the UE leaving the radio access network (RAN) based notification area (RNA), or end of small data, among others. In some embodiments, the CU may send a command for releasing common context information to the DU. The command may be generate and sent by the CU to the DU in response to receipt of the indication of the end of transmission. The command may indicate a reason for the release. In some embodiments, the DU may receive the command for releasing the dedicated context information (e.g., partial or full) from the CU. In some embodiments, the DU may receive the command for releasing the common context information from the CU. Upon communication of the UE context release, both the CU and the DU may cease or terminate using the context information for additional transmission of data from the UE that is in the RRC inactive state. If the UE in the RRC inactive state is to re-start transmission of data (e.g., small data), the UE, DU, and CU may repeat the method 800 from (805) onward.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
receiving, by a distributed unit (DU) from a centralized unit (CU), context information for forwarding of data from a wireless communication device that is in radio resource control (RRC) inactive state;
receiving, by the DU from the wireless communication device, the data from the wireless communication device that is in RRC inactive state;
processing, by the DU, the data according to the context information;
sending, by DU to the CU, the processed data according to the context information;
determining, by the DU, that transmission of the data from the wireless communication device is in RRC inactive state is complete; and
sending, by the DU to the CU an indication of end of the data transmission.

2. The method of claim 1, wherein the context information comprises partial context information of the wireless communication device, the partial context information including context of a dedicated radio bearer (DRB) having information about a transport network layer (TNL) tunnel and a radio link control (RLC) mode.

3. The method of claim 1, comprising sending, by the DU to the CU, a user equipment (UE) context fetching request via an F1 application protocol (F1AP) interface, the UE context fetching request comprising at least one of:
a request for common or partial context information;
an identifier allocated by the DU for the wireless communication device;
an inactive radio network temporary identifier (I-RNTI) of the wireless communication device;
scope of context information to be fetched;
a logical channel identifier (LCID) for each dedicated radio bearer (DRB) to be setup;
downlink (DL) uplink (UP) transport network layer (TNL) tunnel Information for each DRB to be setup;
other context information for each DRB to be setup;
other context information of the wireless communication device; or
information of message type.

4. The method of claim 3, comprising receiving, by the DU from the CU, information for partial UE context setup via the F1AP interface, the information for partial UE context setup comprising at least one of:
an identifier stored by the CU for the wireless communication device;
the identifier allocated by the DU for the wireless communication device;
the LCID for each DRB to be setup;
the DRB identifier for each DRB to be setup;
a radio link control (RLC) mode for each DRB to be setup;
uplink (UL) TNL tunnel information for each DRB to be setup;
the other context information for each DRB to be setup;
the other context information of the wireless communication device; or
the information of message type.

5. The method of claim 4, comprising sending, by the DU to the CU, a partial UE context setup response via the F1AP interface, the partial UE context setup response comprising at least one of:
the identifier stored by the CU for the wireless communication device;
the identifier allocated by the DU for the wireless communication device;
the LCID for each DRB to be setup;
the DRB identifier for each DRB to be setup;
the DL UL TNL tunnel information for each DRB to be setup;
the other context information for each DRB to be setup;
the other context information of the wireless communication device; or
the information of message type.

6. The method of claim 1, wherein the context information comprises common context information for a plurality of wireless communication devices in RRC inactive state.

7. The method of claim 6, wherein the common context is identified by the identifier of one or more virtual wireless communication devices, in the DU and the CU.

8. The method of claim 6, comprising incorporating, by the DU, extra information to a RLC service data unit (SDU) of the data, the extra information including at least one of:
an inactive radio network temporary identifier (I-RNTI) of the wireless communication device; or
a logical channel identifier (LCID) of the data in a medium access control (MAC) protocol data unit (PDU).

9. The method of claim 8, comprising incorporating, by the DU, the extra information to at least one of:
a header for each radio link control (RLC) entity RLC SDU, or
a radio access network (RAN) container extension header of a general package radio service (GPRS) tunneling protocol user plane (GTP-U) tunnel.

10. The method of claim 6, comprising:
determining, by the DU, a priority of the data;
selecting, by the DU according to the priority of the data, a DRB setup according to the received common context;
processing the data using a corresponding radio link control (RLC) entity of the DRB; and
forwarding the processed data using the associated transport network layer (TNL) tunnel for the DRB.

11. The method of claim 10, comprising determining, by the DU, the priority of the data according to at least one of:
a resource used in transmission of the data from the wireless communication device to the DU; or
priority information carried in the data.

12. The method of claim 11, wherein information associating the resource and the priority is sent to the wireless communication device via a RRC signaling message or a SIB.

13. The method of claim 1, wherein determining that that the transmission of the data from the wireless communication device in RRC inactive state is complete further comprises determining that the transmission of the data is complete, according to detection of at least one of: expiration of a timer since a last data received at the DU, a signal indicative of an end of data transmission from the wireless communication device, or a buffer status report (BSR) with a zero buffer size from the wireless communication device.

14. The method of claim 13, wherein the indication of the end of the data transmission is sent via an F1AP interface.

15. The method of claim 14, wherein the indication comprises a cause value in a F1AP message for requesting release of the context information.

16. The method of claim 2, comprising receiving, by the DU from the CU, a command for releasing the partial context information.

17. The method of claim 16, comprising receiving by the DU from the CU, an indication of a reason for the release including the wireless communication device leaving the radio access network (RAN) based notification area (RNA).

18. A distributed unit (DU), comprising:
at least one processor configured to:
receive, via a transceiver from a centralized unit (CU), context information for forwarding of data from a wireless communication device that is in radio resource control (RRC) inactive state;
receive, via the transceiver from the wireless communication device, the data from the wireless communication device that is in RRC inactive state;
process the data according to the context information;
send, via the transceiver to the CU, the processed data according to the context information;
determine, that transmission of the data from the wireless communication device in RRC inactive state is complete; and
send, via the transceiver to the CU, an indication of the end of the data transmission.

19. A method, comprising:
transmitting, by a centralized unit (CU) to a distributed unit (DU), context information for forwarding of data from a wireless communication device that is in radio resource control (RRC) inactive state;
receiving, by the CU from the DU, data transmitted by the wireless communication device and processed by the DU in accordance with the context information; and
receiving, by the CU from the DU, an indication of the end of the data transmission in response to the DU determining that transmission of the data from the wireless communication device in RRC inactive state is complete.

20. A centralized unit (CU), comprising:
at least one processor configured to:
transmit, via a transceiver to a distributed unit (DU), context information for forwarding of data from a wireless communication device that is in radio resource control RRC) inactive state;
receive, via the transceiver from the DU, data transmitted by the wireless communication device and processed by the DU in accordance with the context information; and
receiving, by the CU from the DU, an indication of the end of the data transmission in response to the DU determining that transmission of the data from the wireless communication device in RRC inactive state is complete.

* * * * *